Sept. 7, 1926.
E. B. KERR
UTILITY JACK
Filed Nov. 17, 1924   2 Sheets-Sheet 2
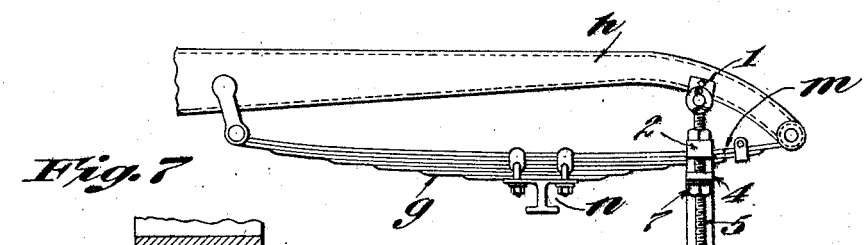
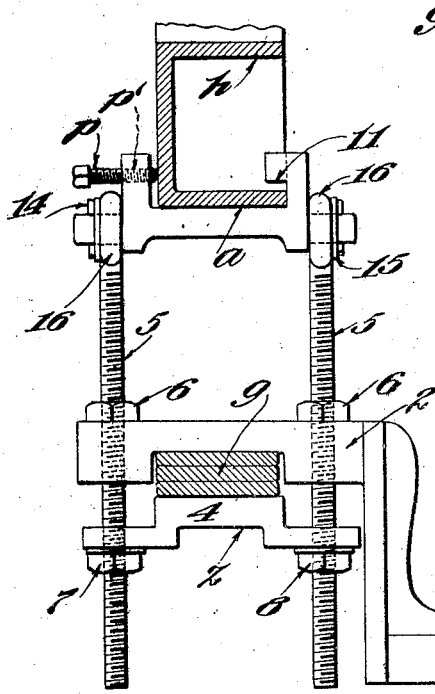
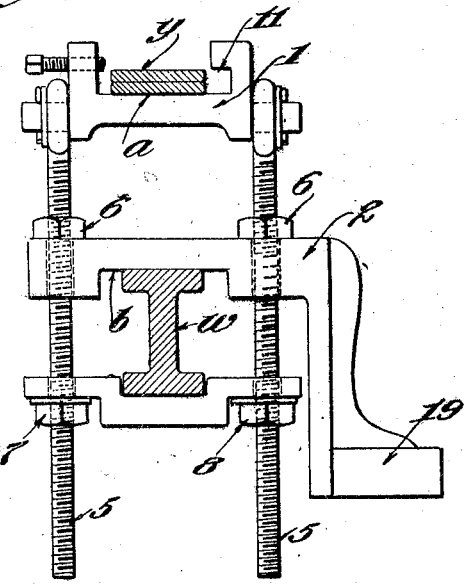
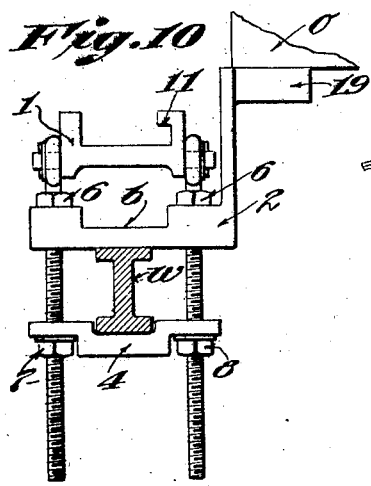
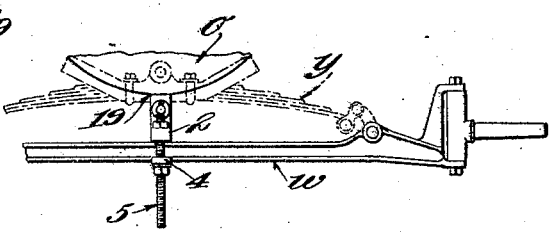
Inventor
Emmons B. Kerr
by Frederick W. Doring
his Atty Patented Sept. 7, 1926.

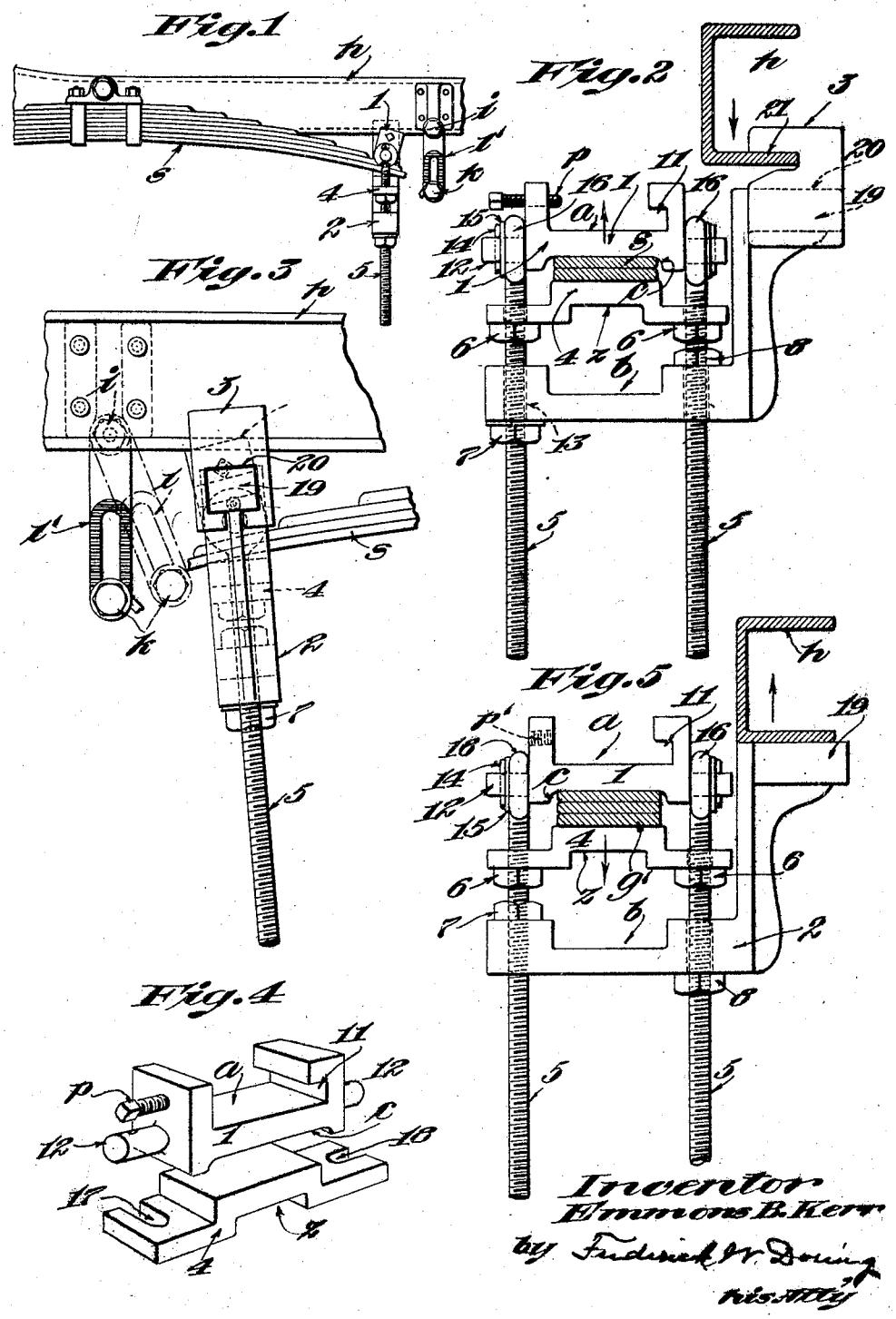

1,598,648

UNITED STATES PATENT OFFICE.

EMMONS B. KERR, OF BOSTON, MASSACHUSETTS, ASSIGNOR OF ONE-HALF TO GEORGE M. HARRIS, OF BELMONT, MASSACHUSETTS.

UTILITY JACK.

Application filed November 17, 1924. Serial No. 750,333.

My invention relates to jacks and more particularly to jacks adapted to use with motor vehicles and the like, and in order to illustrate its operation, I have shown it as applied to automobiles and similar vehicles.

A leading object of my invention is to obviate the inconvenience and loss of time resulting from the breaking of springs on the road. Damage to the shackle bolts, more especially, has heretofore precluded even a temporary repair without towing the car to a garage. My invention provides a device adapted to all types of springs and of such facility of manipulation that its application requires but a negligible expenditure of time, whereupon the spring functions normally until the car reaches its destination, or for such additional time as may elapse before it is convenient to effect a permanent repair.

A further object of my invention is to provide a support for the various parts of an automobile during installation and repair in the shop, a special advantage arising from the ease with which the car may be moved from one spot to another, while such work is being done.

To the accomplishment of the recited objects and others coordinate therewith, the preferred embodiment of my invention resides in the construction and arrangement of parts hereinafter described illustrated in the acompanying drawings in which Fig. 1 shows a side elevation of a frame and cantilever spring with an end elevation of the device in adjusted position.

Fig. 2 is a detail of the same showing a side elevation of the device in adjusted position.

Fig. 3 is a detail of the same taken at another angle.

Fig. 4 is a perspective view of the upper member and clamp.

Fig. 5 is a side elevation of the device in adjusted position showing its operation with a semi-elliptical spring hung from the side of a frame.

Fig. 6 is a side elevation of a frame and semi-elliptical spring of the ordinary type as hung beneath the frame with an end elevation of the device in adjusted position.

Fig. 7 is a side elevation of the device in adjusted position with a spring of the prevailing type lined up with the frame.

Fig. 8 is a side elevation of the device as used with a Ford spring and axle.

Fig. 9 is an end elevation of the device as supporting the engine upon the axle of a Ford car, the spring being removed.

Fig. 10 is a side elevation of the device as used for the same purpose.

The embodiment of my invention illustrated in the drawings comprises substantially the following elements: an upper member 1; two threaded intermediate members 5, 5; nuts 6, 6, 7, and 8 adapted to engage the same; a lower member 2, a hanger 3 coacting with the same; and a clamp 4 provided with the slots 17, 18 adapted to co-act with either the upper or lower member.

The upper member 1 has a recess $a$, adapted to receive a spring or frame, a set screw $p$ engaging said member by means of the threaded hole $p'$, and a slot 11. Said member is also provided with bosses 12 12 adapted to rotatably engage eyelets 16 integral with the intermediate members 5, 5 said engagement being perfected by the use of the washers 15, 15 and the cotter pins 14, 14 and a recess $c$ upon its lower side.

The lower member 2 is perforated by the holes 13 adapted for slidable engagement with the intermediate members 5, 5. The nuts 6, 6, 7, and 8, by their threaded engagement with said members may be raised or lowered by suitable means for the purposes hereinafter shown. The lower member has a recess $b$.

In Fig. 2, $s$ is a cross section of a spring of the cantilever type hung from the side of the frame $h$ as shown in Fig. 1.

In Fig. 3, $i$, $l$, $k$, show in dotted lines the normal position of the shackle with the shackle bolts $i$ and $k$ intact. $l$ in Figs. 1 and 3 shows the shackle hanging down, the bolt $k$ being broken away from the end of the spring $s$. Fig. 2 shows the upper member 1 with its recess $c$ riding the spring $s$. The clamp 4 is positioned with its slots 17 and 18 contacting with the intermediate members 5, 5. By tightening the nuts 6, 6 upward the clamp is made to co-operate with the upper member 1 in firmly binding the spring in position. The lower member 2 is provided with an offset 19 integral therewith. The hanger 3 is provided with a hole 20 by which it is brought into slidable connection with said offset and a slot 21 by which it engages the frame $h$ thereby effecting the suspension of the entire device from the frame as a fixed point. By tightening the nut 8 downward and leveling with the nut 7 the spring $s$ is forced upward to its normal position. It will be obvious that with the members so positioned a repair of the shackle bolts can readily be effected in the shop. Furthermore, if the accident occurs on the road, my device, restoring the identical distance between the frame and springs as when said shackle bolts were intact, is a perfect substitute for the same, while the jack, when positioned near the end of the spring, enables the full resiliency of said spring to be maintained so long as it may be desired to use the car, before halting for a repair. In a word, the expenditure of a few minutes of time accomplishes the same result as if new shackle bolts had been fitted.

In Fig. 7 $h$ represents a cross section of a frame resting in the recess $a$ of the upper member 1, $g$, a cross section of a semi-elliptical spring in alignment with the frame. The slot 11 serves to lock the frame so as to check the tendency of the upper member to roll along said frame, whenever the boss 12 and the set screw $p$ chance to get out of alignment. The lower member 2 is placed in engagement with the intermediate members reversed so that the recess $b$ rides upon said spring. The clamp 4 co-operating with the lower member 2 by the same positioning as shown in Fig. 2, serving to protect the spring from side vibration due to going over the road. By tightening the nuts 6, 6, and leveling with the nuts 7 and 8, the spring is forced downward, thereby restoring its normal distance from the frame.

Fig. 5 shows a spring $g'$ of the semi-elliptical type hung from the side of the frame $h$. Said spring is positioned by means shown in Figs. 2 and 7. The frame $h$ rests upon the offset 19. By tightening the nut 8 upward and leveling with the nut 7 the spring $g'$ is pulled downward to the adjusted position shown in said Fig. 5 restoring the normal positioning of said spring in relation to the said frame.

The breaking of the leaves of a spring on the road has heretofore caused difficulties as unsurmountable as those hereinbefore shown in connection with shackle bolts, there being no known means of supporting the spring save by the use of a block which totally destroyed the resiliency of said spring. In Fig. 6 the spring is broken at $m$. The upper member 1 engages the frame $h$ as shown in Fig. 7, and the leaves of the spring $g$ clamped firmly by lower member 2 and clamp 4 as shown in Fig. 2 are enabled to function normally for any desirable time, and my device operates with similar effectiveness, when the center bolt $n$ is broken or any part of the spring is broken.

Furthermore my device may serve as a bracket for the support of the various parts of a car. Figs. 9 and 10 show the engine of a Ford car $o$ supported by the offset, the spring $y$ being shown as removed.

Fig. 8 shows the operation of my invention on the rear spring of a Ford car. The spring $y$ is fixed in the recess $a$ of the upper member 1 by means of the set screw $p$. The lower member 2 engages the intermediate member in a reversed position whereby the recess $b$ rides upon the axle $w$. The clamp 4 is positioned with its recess $z$ engaging the lower part of the axle to check side vibration as hereinbefore shown. The nuts 6, 6 are then screwed downward and by leveling with the nuts 7 and 8 the spring is forced upward to the adjusted position shown, thereby restoring the normal positioning of the spring in relation to the said frame.

From the foregoing it will be noted that by the provision of the means shown and described, a jacking device is provided which in a manner analogous to the operations specifically shown is adapted to many other equally advantageous results. By its use the mechanic is enabled to line the front end of rear spring and ream bushing through hole in splash pan saving time and labor of removing muffler and dropping spring. Its use as bracket is invaluable during installation and repair, and as has been shown, it may be employed for the various uses for which a clamp is desired. In a word, its efficiency is limited only by the emergencies that may arise.

While the disclosures hereinbefore shown are considered to exemplify preferable embodiments of the invention, it is to be understood that it is not the intention to be limited necessarily thereto in interpretation of the claims, as modifications and adaptations within the limits of the claims can be made without departing from the nature and spirit of the invention.

So far as I am aware, I am the first in the art to produce the concrete unitary structure herein described and claimed, and my claims to the herein described features are therefore to be interpreted with corresponding scope.

I claim—

1. A device of the character described comprising an upper member, two intermediate members pivotably engaging the same, a lower member slidably engaging the intermediate members, means for forcing the upper and lower members apart and fixing the position of the lower member at predetermined points on the intermediate members, and an offset portion.

2. A device of the character described comprising an upper member recessed to receive a spring, means for fixing the same in firm engagement with said upper member, a pair of threaded bolts, a lower member slidably engaging said threaded bolts, said lower member being provided with a recess, and means for forcing the lower member to a predetermined point on said threaded bolts.

3. A device of the character specified, comprising an upper member provided with a recess, a set screw, a slot, and two bosses, a pair of threaded intermediate members, provided with eyelets adapted for rotatable engagement with said bosses, a plurality of nuts forming threaded engagement with said intermediate members, a lower member provided with holes adapted to form slidable connection with said intermediate members and means for effecting an engagement with a frame.

4. A device of the character specified comprising an upper member, a lower member, a pair of intermediate members, and means for forcing the lower member to a predetermined distance from the upper member, said lower member being provided with an offset integral therewith.

5. A device of the character described comprising an upper member, a clamp co-operating with the same so as to bind a spring $s$ in the recess $c$, a pair of threaded intermediate members, a lower member provided with an offset, said lower member slidably engaging the intermediate members in a reversed position, a hanger slidably engaging said offset, said hanger being provided with slot adapted to effect an engagement with a frame whereby the device is suspended from said frame and means for forcing said upper member upward.

6. In combination, an upper member provided with a recess, a clamp co-operating with the same so as to hold a spring $s$ in engagement, two intermediate members, a lower member, a hanger adapted to engage a frame and means for forcing apart said upper and lower members.

7. A device of the character described comprising an upper member provided with a recess adapted to engagement with a frame, means for locking the frame in said recess, two intermediate members, a lower member slidably engaging said intermediate members provided with a recess $b$ adapted to ride in engagement with said recess, a spring $g$ of the usual type hung in alignment with said frame, and means for forcing apart said upper and lower members.

8. A device of the character specified comprising an upper member with a recess adapted to engage a spring, means for locking said member to said spring, a pair of threaded intermediate members, a lower member having a recess adapted to ride an axle $w$, nuts adapted to be screwed by suitable means so as to force said spring and axle apart, and a clamp adapted to avoid vibration in going over the road.

9. A device of the character described having an upper member with a recess adapted to ride a cantilever spring offset from a frame, a pair of threaded intermediate members, a clamp slidably engaging said intermediate members, means for locking said upper member and clamp so as to firmly engage the spring, a lower member provided with an offset, a hanger slidably engaging said offset, and provided with a slot adapted for engagement with a frame, and means for forcing the spring upward to its normal position in relation to the frame.

10. A device of the character specified having an upper member with an upper recess $a$ having a slot 11 on one side, a set screw $p$ engaging said upper member by the threaded hole $p'$ and a lower recess $c$, said frame engaging the recess in said lower member, two threaded intermediate members, a lower member having a recess adapted to ride a spring and an integral offset adapted to serve as a supporting bracket, a hanger adapted for slidable engagement with said offset so as to co-operate with said lower member, a clamp member adapted to co-operate with either lower or upper member at the will of the operator and a plurality of nuts adapted to co-operate with the intermediate members so as to force apart the upper and lower members.

11. A device of the character described comprising an upper member 1 with a recess $a$ adapted to engage a spring $y$, means for locking said member to said spring, a pair of threaded intermediate members, a lower member 2 having a recess $b$ adapted to ride an axle $w$ and means for forcing said spring and axle apart.

12. A device of the character described comprising an upper member 1 with a set screw $p$ in threaded engagement therewith, and having a recess $a$ adapted to hold a frame $h$ in engagement by means of said set screw, and provided with a slot 11 adapted to prevent said upper member from rolling along the frame whenever the boss 12 and the said set screw get out of alignment, a pair of intermediate members 5, a lower member 2 engaging the same in a reversed position whereby it rides a spring $g$ hung in alignment with the said frame, means for forcing said frame and spring apart, and a clamp 4 adapted to prevent vibration in going over the road.

13. A device of the character described comprising an upper member 1 with its lower recess $c$ riding a spring $g'$, a pair of threaded intermediate members 5, a lower member 2 provided with an offset slidably engaging said intermediate members in a reversed position said offset 19 adapted to form a support for a frame, and means for forcing the spring downward to its normal position in relation to the frame.

14. A device of the character described comprising an upper member 1 a clamp cooperating with the same to fix a spring $g'$ in the lower recess $c$ of said member, a pair of intermediate members 5, a lower member provided with an offset 19 engaging said intermediate members in a reversed direction so that the frame rides upon said offset, and means for forcing the upper member and spring downward.

15. A jack comprising an upper member 1, a pair of intermediate members 5, a lower member 2 adapted to slidably engage said intermediate members in a reversed direction, said lower member being provided with an offset 19 adapted to support an automobile engine, a clamp 4, and means for fixing the members in adjusted position.

16. A device of the character described adapted to general jacking, clamping and supporting purposes comprising an upper member 1 recessed on both sides, and provided with a set screw $p$ engaging the same by means of a threaded hole $p'$, a pair of threaded intermediate members 5 with eyelets 16 integral therewith adapted to rotatably engage bosses 12 integral with said upper member, means for perfecting said rotatable engagement, recessed lower member 2 slidably engaging said intermediate members and provided with an offset 19 adapted to serve as a bracket when engaging said intermediate members in a reversed direction, a plurality of nuts 5 and a clamp provided with a recess $z$ and slots 17 and 18 adapted to engage said intermediate members, and means varying the distance between the upper and lower members at the will of the operator.

17. A jack comprising an upper member 1, a pair of threaded bolts 5, a plurality of nuts, and a lower member 2 slidably engaging said bolts in a reversed direction, said lower member being provided with an offset 19 adapted to support an automobile engine $o$ and means for fixing said lower member so as to rest on an axle $w$ at a predetermined distance from said upper member.

18. A jack comprising an upper member 1, a pair of intermediate members 5, a lower member 2 provided with an offset 19 adapted for lifting and supporting purposes, and a plurality of nuts engaging said intermediate members.

19. A device of the character described consisting of an upper member 1, a lifting and supporting member 2, and means for effecting the co-operation of said members for jacking purposes.

20. A device of the character described comprising an upper member 1, a pair of threaded intermediate members 5, a lower member 2, and means for effecting the co-operation of said members for positioning an automobile spring at the normal distance from a frame.

21. A device of the character described comprising an upper member recessed to receive a frame, means for fixing the same in firm engagement with said upper member, a pair of threaded bolts, a lower member slidably engaging said threaded bolts, said lower member being provided with a recess, and means for forcing the lower member to a predetermined point on said threaded bolts.

In testimony whereof I affix my signature.

EMMONS B. KERR.